(12) United States Patent
Dvorak et al.

(10) Patent No.: US 8,427,794 B2
(45) Date of Patent: Apr. 23, 2013

(54) MULTI-POLE ARC-FAULT CIRCUIT INTERRUPTER

(75) Inventors: Robert F. Dvorak, Mt. Vernon, IA (US); Brett Larson, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 215 days.

(21) Appl. No.: 12/487,827

(22) Filed: Jun. 19, 2009

(65) Prior Publication Data

US 2010/0321836 A1 Dec. 23, 2010

(51) Int. Cl.
*H02H 3/16* (2006.01)

(52) U.S. Cl.
USPC ............................................. 361/42; 361/44

(58) Field of Classification Search ............... 361/42, 361/45, 46, 93.1, 93.5, 93.2, 94, 44
See application file for complete search history.

(56) References Cited

U.S. PATENT DOCUMENTS

| | | | |
|---|---|---|---|
| 5,561,605 A * | 10/1996 | Zuercher et al. | 702/64 |
| 6,246,556 B1 * | 6/2001 | Haun et al. | 361/42 |
| 6,426,632 B1 * | 7/2002 | Clunn | 324/509 |
| 7,136,265 B2 | 11/2006 | Wong et al. | |
| 7,151,656 B2 * | 12/2006 | Dvorak et al. | 361/63 |
| 7,253,637 B2 | 8/2007 | Dvorak et al. | |
| 7,254,004 B2 * | 8/2007 | Mladenik et al. | 361/93.1 |
| 2006/0072270 A1 * | 4/2006 | Mladenik et al. | 361/93.1 |

OTHER PUBLICATIONS

Bolt-on & Plug-in Arc Fault Circuit Interrupters; GE Industrial Systems; GE catalog No. THQL2115AF; Dated 2002; (2 pages).
Siemens Product Catalog for 2-Pole Combination Type AFCI QAF/H Type; (downloaded Sep. 29, 2009); (1 page).
Siemens Fast Fax for 2-Pole AFCI Q215AF Circuit Breakers; (2008); (2 pages).
Eaton Circuit Breakers Product Selection for Type BR 2-Pole Plug-on Circuit Breakers; (Jan. 2008) (pp. 3-65 to 3-68).

* cited by examiner

*Primary Examiner* — Danny Nguyen
(74) *Attorney, Agent, or Firm* — Nixon Peabody LLP

(57) ABSTRACT

A multi-pole circuit breaker having the same number of sensors and controllers as poles. One pole is monitored by a first sensor and a first controller, which are disposed on a first circuit board. Another pole is monitored by a second sensor and a second controller, which are disposed on a second circuit board that is cable-connected to the first circuit board. A ground-fault sensor monitors the sum of current flowing through the line conductors and a neutral conductor, and the output of the ground-fault sensor is provided to one or both of the controllers. Each controller is operable to detect arc faults on the respective line that it is monitoring, and at least one is operable to detect ground faults. A push-to-test algorithm is executed in relay fashion, with one controller executing the test before passing the result of the test onto the next controller, which in turns executes the test.

16 Claims, 2 Drawing Sheets

MULTI-POLE ARC-FAULT CIRCUIT INTERRUPTER

FIELD OF THE INVENTION

This invention is directed generally to electrical circuit breakers, and, more particularly, to a multi-pole arc-fault circuit breaker.

BACKGROUND

Multiple pole (also referred to as "multi-pole") arc-fault circuit breakers (also called arc-fault circuit interrupters) are typically used in some residential applications. Contractors may elect to run two branch circuits in a three-conductor cable (two lines and one neutral) from a tie point, and connect them to a two-pole circuit breaker, reducing the cost of material and labor of installing two separate cables to the circuit-breaker panel from the individual branch circuits. This technique is known in the trade as a shared neutral, because the two circuits share the same neutral conductor back to the panel from the point where they are spliced into the three-conductor cable.

The advent of National Electrical Code (NEC) requirements for arc-fault protection on certain branch circuits has given rise to the need for two-pole arc-fault circuit breakers. In other instances, arc-fault protection may be desired for 240V loads, which also require two-pole arc-fault interrupting circuit breakers. Such circuit breakers include multiple current sensors for monitoring multiple lines. Arc faults are detected by a sophisticated algorithm run by a microcontroller in the circuit breaker. It is critical that the integrity of the sensed current from the sensors be preserved from the output of the sensor to the input of the controller to maximize detection of valid fault conditions. Any degradation or corruption of that signal could lead to faulty detection or, worse, missed detections, which would be hazardous.

What is needed, therefore, is a multi-pole circuit breaker capable of detecting arc faults occurring on any of the poles being monitored that overcomes these and other problems.

BRIEF SUMMARY

In electronic circuit breakers, a microprocessor or similar integrated circuit is programmed to detect whether certain fault conditions exist, and the microprocessor outputs a trip signal that causes a switching device to energize a solenoid that causes movable contacts to separate, thereby disconnecting the line from the load. In single-pole circuit breakers, there is typically a single sensor for monitoring line current and a single microprocessor or microcontroller that is programmed to detect arc-fault conditions. Conventional wisdom would suggest that to expand the arc-fault protection to more than one pole, it would be desirable to continue to use a single microprocessor. Today's microprocessors are clearly more than powerful enough to handle such detection schemes for multiple poles of a circuit breaker. However, in a two-pole circuit breaker, two sensors monitoring each of the two lines are required, and these sensors are mounted in separate circuit boards, which are connected together by a cable connector. As a result, disposing a single microprocessor on only one of the circuit boards significantly lengthens the electrical traces needed to carry the output signals from the sensor to the microprocessor. Moreover, if the single microprocessor fails, arc-fault detection cannot be carried out by the circuit breaker. The source code that has been developed for a single-pole arc-fault circuit breaker cannot be easily "recycled" for a two-pole arc-fault circuit breaker. The source code needs to be substantially rewritten to monitor the various ports of the microprocessor that monitor the inputs and to assign functions for processing the signals received at the inputs.

What is proposed herein is a multi-pole circuit breaker that detects arc faults via multiple controllers (as many as there are poles), each disposed on separate corresponding circuit boards. Each circuit board also supports one of the sensors that monitors the corresponding line. The traces that need to be run from the sensors to each of the controllers are much shorter compared to a multi-pole circuit breaker that has only one controller. The signals running through the traces are susceptible to degradation due to electromagnetic interference, and the sensor outputs need to be as clean and unaffected to ensure accurate and undistorted readings. The source code that has been developed for single-pole circuit breakers can be recycled and used for each of the controllers, which operate independently of one another. Finally, should one controller fail, the other line being monitored by the other controller is still protected, so the circuit breaker can still effectively operate as a single-pole circuit breaker.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
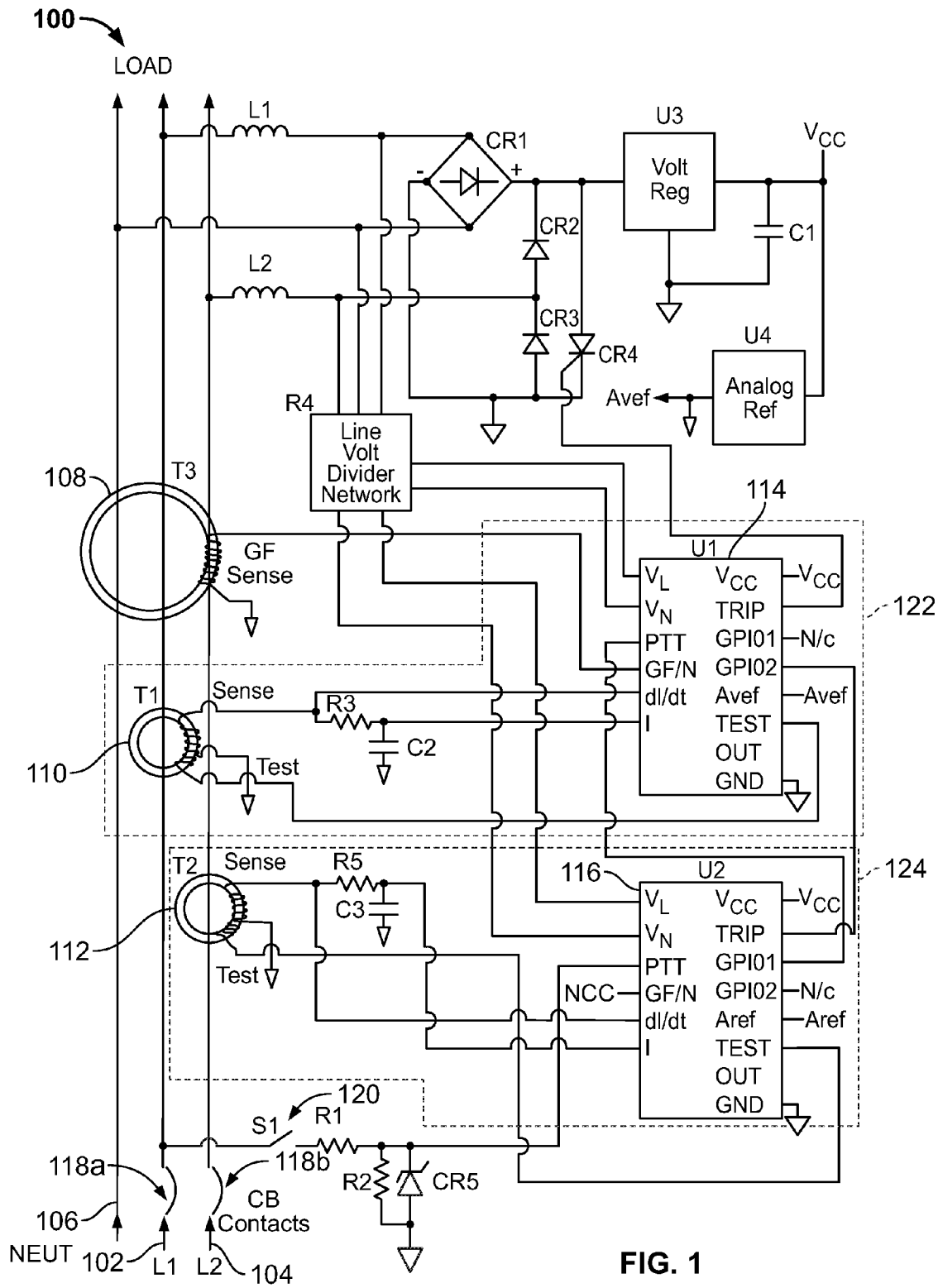
FIG. 1 is a circuit diagram of a two-pole circuit breaker having two controllers coupled to two sensors for sensing the alternating current flowing through a corresponding line conductor.

Referring to FIG. 1, a functional block diagram of a multi-pole circuit breaker 100 is shown. The circuit breaker 100 monitors a first line conductor 102 (also called line 1 or "L1" in FIG. 1), a second line conductor 104 (also called line 2 or "L2" in FIG. 1), and a neutral conductor 106, and interrupts current flow to a load in response to detecting a fault condition on any one or more of the conductors 102, 104, 106 by opening one or both movable contacts 118a,b. The fault condition can be a series or parallel (e.g., either line-to-either line, line 1-to-neutral, line 2-to-neutral, or line-to-ground) arc fault, a ground fault, a short circuit, or an overload, for example. Arc-fault conditions are specified in the Underwriters Laboratories Standard UL1699. The first line conductor 102 is labeled L1 in FIG. 1 and refers to line 1, the second line conductor is labeled L2 and refers to line 2, and the neutral conductor 108 is labeled NEUT and refers to neutral.

The circuit breaker 100 includes a ground-fault sensor 108, a first sensor 110, and a second sensor 112. The first and second sensors 110, 112 are each shaped like a toroid and surround a portion of the first and second line conductors 102, 104, respectively, and produce corresponding first and second signals indicative of alternating current (AC) flowing through the first and second conductors, respectively. The first and second sensors 110, 112 are preferably current rate of change sensors, also called di/dt sensors, that generate a voltage signal that is proportional to a time rate of change of the AC line current flowing through the first or second line conductor (102, 104) being monitored. The first and second sensors 110, 112 can alternately be current sensors, each producing a first and second signal, respectively, that is proportional to the alternating current passing through the corresponding conductor. The outputs of the first and second sensors 110, 112 can optionally be passed through corresponding voltage divider circuits (not shown) to reduce their levels to levels that are safe for the controllers 114, 116 in response to rapidly changing currents during an arcing or switching event, for example.

The circuit breaker 100 further includes a first controller 114 operatively coupled to the first sensor 110 and a second controller 116 operative coupled to the second sensor 112 as shown. The first sensor 110 and the first controller 114 are disposed on a first circuit board 122. The second sensor 112 and the second controller 116 are disposed on a second circuit board 124. Details of the first and second controllers 114, 116 are discussed below in connection with FIG. 2.

Two line-powered inductors L1 and L2 are preferably trip solenoid coils, through which current from the line conductors 102, 104, respectively, must flow to power the electronic components of the circuit breaker 100. The diode bridge CR1 and the diodes CR2 and CR3 form a full-wave diode bridge that rectifies the line voltage from the first line conductor 102 or the second line conductor 104 to produce a corresponding rectified line voltage. The voltage regulator U3, which can be a linear regulator, a switching regulator, or a combination thereof, reduces the rectified line voltage to a supply voltage, Vcc (e.g., 3.3V), which is suitable for the integrated circuits in the circuit breaker including the controllers 114, 116. The voltage regulator U3 is part of a power supply that produces the supply voltage, Vcc, which is derived from the first or second line conductors 102, 104 as just described. The analog reference U4 generates a voltage reference for the integrated circuits including the controllers 114, 116, such as corresponding to the midpoint of Vcc (1.65V above circuit ground in this example).

The line volt-divider network R4 divides the line voltage in each of the line conductors 102, 104 from approximately 170V peak at nominal line voltage to a divided line voltage of about 1V peak. The divided line voltage corresponding to the line conductors 102, 104 is provided to the first and second controllers 114, 116, respectively, for detecting voltage zero crossings or to measure line voltage. The first and second controllers 114, 116 each detects arc-fault conditions in the line conductors 102, 104, respectively. The controller 114 also detects ground-fault conditions from either line 1 or line 2 to ground. The controllers 114, 116 can be an application specific integrated circuit (ASIC), such as described in U.S. Pat. No. 7,151,656, or a microcontroller or microprocessor, such as an MC68HLC908 microcontroller available from Motorola. Alternately, the controllers 114, 116 can be a combination of an ASIC and a microcontroller, such as described in U.S. Pat. No. 6,2246,556. As used herein, the terms microcontroller and microprocessor are synonymous.

As mentioned above, the first and second sensors 110, 112 are preferably di/dt sensors that produce a voltage proportional to the time rate of change of current in the line being sensed (the term "di/dt" refers to a time derivative of the line current). The di/dt output signals from the first and second sensors 110, 112 are passed through integrator circuits R3/C2 and R5/C3, and optionally low-pass filters (not shown) with cutoff frequencies of about 1.5 kHz, to produce scaled, substantial reproductions of the 60 Hz line alternating currents of lines 1 and 2 (corresponding to the line conductors 102, 104). The resultant 60 Hz alternating current signals are applied to corresponding pins labeled "I" of the first and second controllers 114, 116. The di/dt output signals are provided to corresponding pins labeled "di/dt" of the first and second controllers 114, 116.

If an arc-fault condition occurs on the first line conductor 102, the di/dt and line current signals generated by the first sensor 110 are applied to the corresponding inputs labeled "di/dt" and "I" of the first controller 114. Likewise, if an arc-fault condition occurs on the second line conductor 104, the di/dt and line current signals generated by the second sensor 112 are applied to the corresponding inputs labeled "di/dt" and "I" of the second controller 116. The ground-fault sensor 108 senses a ground-fault condition and produces a ground-fault sensor signal (labeled "GF Sense") representing the sum of the current flowing through the conductors 102, 104, 106. This ground-fault sensor signal outputted by the ground-fault sensor 108 is applied to the first controller 114 at a ground-fault input thereof labeled "GFIN." The ground-fault sensor 108 causes the GFIN signal to be applied to the first controller 114 in response to a line current imbalance between lines 1 and 2 and neutral, which may be caused by the incipient stages of an arc-fault condition. The controllers 114, 116 analyze the output signals from the sensors 108, 110, 112 to determine whether abnormal arcing conditions exist in the circuits associated with line 1 (line conductor 102) or line 2 (line conductor 104). Suitable algorithms and methods for detecting arc-fault and ground-fault conditions are set forth in U.S. Pat. Nos. 6,246,556 and 7,136,265, for example.

To test the circuit breaker 100, a push-to-test (PTT) button 120, shown as S1, is actuated. When the PTT button 120 is closed, a voltage from the first line conductor 102 to circuit ground is applied to the voltage divider R1/R2, and is clamped to approximately 3V by the zener diode CR5. The resulting voltage is applied to an input labeled "PTT" of the second controller 116 as a PTT input signal. The current through R1 and R2 passes through circuit ground and back through diode CR3 or through one of the diodes of the diode bridge CR1, causing a ground-fault condition to exist in the ground-fault sensor 108. In response, the second controller 116 detects a signal high (e.g., a logic level high) at its PTT input pin, and initiates a push-to-test algorithm 220 (FIG. 2), which applies a test signal, for example 40 kHz, to the test winding (labeled "Test" in FIG. 1) of the second sensor 112. This causes a corresponding signal to appear at the sense winding (labeled "Sense") of the second sensor 112. If a signal of sufficient voltage and frequency is detected at the di/dt input of the second controller 116, the second controller 116 toggles an I/O port pin, GPIO1, to a logic high level and continues to test for a proper ground fault level at its GFIN input. Note that in this illustrative and non-limiting example, it is not necessary for the second controller 116 to detect ground faults because it is not connected to the ground-fault sensor 108. To exploit economies of scale, the second controller 116 can be programmed, like the first controller 114, to detect a ground-fault signal via an optional ground-fault detection algorithm 222 (FIG. 2), but being actually unable to detect one due to its disconnection from the ground-fault sensor 108, the second controller 116 will simply not produce a trip signal at its output TRIP pin. In this way, the same firmware can be loaded onto the first and second controllers 114, 116, but the ground-fault detection algorithm 222 for the second controller 116 would never detect a ground-fault condition.

Alternately, the corresponding firmware for each of the controllers 114, 116 can allow only certain portions to be used in one of the controllers 114, 116. For example, one or more I/O port pins on the controller 114, 116 can be read at power-up to determine what sections of the firmware code should be used for that controller. In this example, the firmware code corresponding to a ground-fault detection algorithm for the second controller 116 can be omitted during the PTT operation.

After a predetermined time after the second controller 116 initiates the PTT test, such as 100 ms later, the controller 116 can be reverted back into a normal arc detection mode. The delay time should be long enough to allow the first controller 114 to carry out the PTT test.

Upon sensing a high at its PTT pin, the first controller 114 enters a test mode and executes a first push-to-test algorithm 210 (shown diagrammatically in FIG. 2) stored in its firmware. The first controller 114 carries out the same tests described above in connection with the second controller 116. When a ground-fault signal, simulated or actual, is sensed by the ground-fault sensor 108, and the first controller 114 successfully completes both the arc-fault test (also called a di/dt test) via an arc-fault detection algorithm 208 (FIG. 2) and the ground-fault test via a ground-fault detection algorithm 212 (FIG. 2), the first controller 114 causes its TRIP pin to go high. A high at the TRIP pin of the first controller 114 is applied to the gate of the silicon controlled rectifier (SCR) CR4, causing CR4 to conduct across the positive and negative terminals of the full-wave bridge CR1. This conduction effectively shorts lines 1 and 2 (line conductors 102, 104) across the series combination of the trip solenoid coils L1 and L2, causing the circuit breaker mechanism (not shown) to open the first and second movable contacts 118a,b, thereby disconnecting the load from the power source. The opening of the first and second movable contacts 118a,b of the circuit breaker 100 indicates to the user that the PTT operation was successful and that the circuit breaker 100 is operating properly. Thus, the PTT test is said to "pass" when it successfully trips as expected on a simulated fault condition. The PTT test "fails" when it fails to trip as expected on a simulated fault condition.

If the results of the arc-fault test at the second controller 116 or the ground-fault or arc-fault test at the first controller 114 are not within normal test limits, the SCR (CR4) will not fire and the circuit breaker 100 will not trip, indicating abnormal operation and a failure of the PTT test.

If an arc-fault condition occurs on the first line conductor 102 or a ground-fault condition occurs on the first or the second line conductors 102, 104, the first controller 114 directly applies a trip signal via its TRIP pin to the gate of the SCR (CR4) as described above. If an arc-fault condition occurs on the second line conductor 104, the second controller 116 sets its TRIP pin high. The output of the TRIP pin of the second controller 116 is applied to the I/O pin GPIO2 pin of the first controller 114, or it can be logic ORed with the trip output from the first controller 114, such as via a simple diode OR circuit at the gate of the SCR (CR4). If the output of the TRIP pin of the second controller 116 is applied to the GPIO2 pin of the first controller 114 as illustrated, the first controller 114 periodically tests for a high at its GPIO2 pin, and immediately institutes a trip signal via its TRIP pin to the gate of the SCR (CR4). In the event of a line-to-line arc-fault condition, both the first and second controllers 114 and 116 will sense the arc-fault condition, and either or both can initiate a trip signal.

Figure 2:
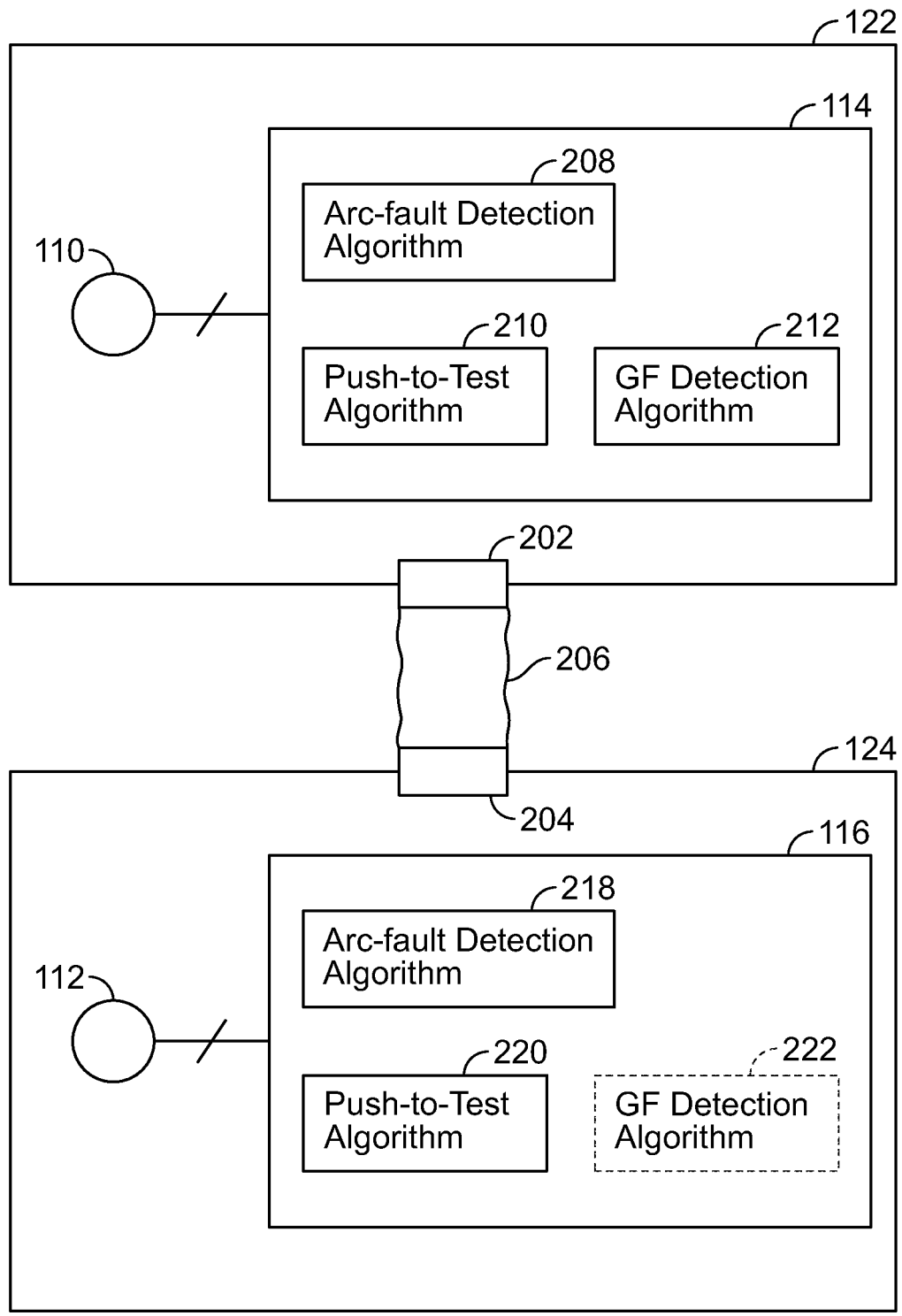
FIG. 2 is a functional block diagram of a circuit-board arrangement that can be used in the circuit breaker shown in FIG. 1.

FIG. 2 is a functional block diagram of the first and second circuit boards 122, 124 electrically connected together by a cable 206. Alternately, the first and second circuit boards 122, 124 can be connected directly together via corresponding connectors or other connecting means instead of via the cable 206. The first circuit board 122 has disposed thereon at least the first sensor 110 and the first controller 114, which includes a first memory (not shown) on the first controller 114. Alternately, the first memory can be incorporated into an integrated circuit that is separate from the first controller 114 and operatively connected thereto such that the first memory is accessible by the first controller 114. Likewise, the second circuit board 124 has disposed thereon at least the second sensor 112 and the second controller 116, which includes a second memory (not shown) on the second controller 116. Alternately, the second memory can be incorporated into an integrated circuit that is separate from the second controller 116 and operatively connected thereto such that the second memory is accessible by the second controller 116.

The first circuit board 122 includes a first connector 202 that connects to the cable 206 that also connects to a second connector 204 on the second circuit board 124. The output TRIP pin of the second controller 116 is operatively connected to the GPIO2 input of the first controller 114 via the cable 206, for example. However, it should be emphasized that the first and second sensors 110, 112 are placed in close proximity to the first and second controllers, 114, 116, respectively, reducing the lengths of the electrical traces needed to carry signals between the sensors 110, 112 and the controllers 114, 116. As a result, any electromagnetic interference (EMI) or noise that might corrupt or degrade the integrity of the signals is reduced compared to an arrangement in which the sensor output signal would have to traverse a relatively long distance from one circuit board to another via a cable. In a circuit breaker, particularly one that is configured to detect arc-fault conditions, it is important that the outputs from the sensors be as accurate as possible so that the detection algorithms can properly analyze the content of the signals to look for an arcing signature. Any degradation or corruption of that output signal can adversely affect the arc-fault detection scheme, resulting in either nuisance trips or not tripping at all in response to actual arc-fault events.

Although in the illustration two circuit boards 122, 124 are shown, alternately, any or all of the sensors 108, 110, 112 and any or all of the controllers 114, 116 can be disposed on a single circuit board. Further still, the sensors 108, 110, 112 can be disposed on one or more substrates that are physically separate from one or more circuit boards supporting the controllers 114, 116.

The first controller 114 includes a first arc-fault detection algorithm 208, a first push-to-test (PTT) algorithm 210, and a first ground-fault detection algorithm 212. These algorithms are shown as separate modules or functional blocks in FIG. 2 to indicate their particular functionality; however, they do not have to be organized in the source code as separate and distinct blocks. Likewise, the second controller 116 includes an arc-fault detection algorithm 218, which can be identical to the first arc-fault detection algorithm 208, a PTT algorithm 220, which can also be identical to the PTT algorithm 210, and an optional ground-fault detection algorithm 222, which can be identical to the ground-fault detection algorithm 212. In the circuit illustrated in FIG. 1, the ground-fault sensor 108 is not connected to the second controller 116, so even though the firmware for the second controller 116 may include the ground-fault detection algorithm 222, this algorithm 222 would simply not produce a trip signal at its TRIP or GPIO1 outputs. Alternately, for redundancy, such as in case the first controller 114 becomes inoperable or defective, the ground-fault sensor 108 can be connected to the second controller 116. In such an example, the second controller 116 can still detect ground-fault conditions even when the first controller 114 cannot.

Another advantage to having multiple arc-fault detection algorithms 208, 218 is that if one of the controllers 114, 116 becomes inoperable or disabled, the other controller is still able to detect arc-fault conditions on the line it is monitoring. If that controller is also able to detect ground-fault conditions, then essentially two-thirds of the electronic detection functionality of the circuit breaker is preserved (i.e., detection of arc faults on line 1 or 2 plus detection of ground faults versus detection of faults on lines 1 and 2 plus ground faults), even when one controller fails. This would not be the case were a single controller used in a multi-pole circuit breaker. If the single controller were to fail, then a complete loss of electronic detection functionality of the multi-pole circuit breaker would occur.

Alternately, the controllers 114, 116 can be connected together via their unused GPIO1 and GPIO2 pins, respectively, or any other programmable I/O pin, to monitor the functioning of the other controller. If one controller stops functioning, the other controller detects the loss of function via the I/O pin that is configured to monitor the state of the controller, and immediately initiates a trip signal via its TRIP pin. Still further, the controllers 114, 116 can be programmed to monitor different or the same (for redundancy) subsystems within the circuit breaker 100, such as the power supply, and to trip the circuit breaker 100 when those subsystems fail to operate properly. The use of multiple controllers make it more likely that the circuit breaker 100 will detect component failures as well as faults and respond by tripping the circuit breaker 100, bringing the protected circuit into an electrically safe state.

The arc-fault detection algorithm 208, 218 determines whether a series or parallel arc fault is present relative to at least the first line conductor 102 as a function of the first signal. The ground-fault detection algorithm 212, 222 determines whether a ground fault is present on either of the line conductors 102, 104 relative to ground as a function of the ground-fault sensor signal (labeled "GF Sense" in FIG. 1) produced by the ground-fault sensor 108.

The PTT algorithm 210, 220, as described above, responds to the PTT input signal received by the second controller 116, and the PTT algorithm 210, 220 produces an indication of a pass or a fail. As mentioned above, a pass indicates that the simulated fault condition was properly interpreted by the controller 114, 116 as a fault condition, whereas a fail indicates that the simulated fault condition was not interpreted by the controller 114, 116 as a fault condition as expected. In response to the PTT algorithm 220 producing a "pass" result, the second controller 116 causes an output signal via its GPIO1 pin to be sent to the GPIO2 pin of the first controller 114, which, in turn, executes the PTT algorithm 210. If a "pass" result is produced by the PTT algorithm 210, the circuit breaker 100 trips by opening the movable contacts 118a,b, indicating a successful test of the PTT operation.

It should be noted that the algorithms 208, 210, 212, 218, 220, and 222 are illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

The use of the words first, second, and the like, are not intended to imply any particular order or importance nor to exclude higher numbers. Rather, they are simply convenient labels for differentiating among the various components or modules with which they are associated.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A multi-pole circuit breaker operable to detect a series or parallel arc fault relative to one or more of at least two line conductors being monitored by the circuit breaker, comprising:
a first sensor producing a first signal indicative of alternating current flowing through a first line conductor of the at least two line conductors;
a second sensor producing a second signal indicative of alternating current flowing through a second line conductor of the at least two line conductors;
a first controller operatively coupled to the first sensor, the first controller being programmed with instructions corresponding to a first arc-fault detection algorithm stored on a first memory accessible by the first controller, wherein the first arc-fault detection algorithm is operable to determine whether the arc fault is present on at least the first line conductor as a function of the first signal, and responsive thereto, produce a first output trip signal;
a second controller operatively coupled to the second sensor, the second controller being programmed with instructions corresponding to a second arc-fault detection algorithm stored on a second memory accessible by the second controller, wherein the second arc-fault detection algorithm is operable to determine whether the arc fault is present on at least the second line conductor as a function of the second signal, and responsive thereto, produce a second output trip signal;
a movable contact operable to interrupt the flow of alternating current from the first line conductor or from the second line conductor responsive to the first output trip signal or the second output trip signal,
wherein the first controller is further programmed with instructions corresponding to a first push-to-test algorithm stored on the first memory,
wherein the second controller is further programmed with instructions corresponding to a second push-to-test algorithm stored on the second memory,
wherein the second push-to-test algorithm is initiated responsive to a push-to-test input signal received by the second controller, the second push-to-test algorithm being operable to produce an indication of a pass or a fail, and responsive thereto, cause an output signal to be sent to the first controller, wherein the first controller, responsive to receiving the output signal from the second controller, initiates the first push-to-test algorithm.

2. The multi-pole circuit breaker of claim 1, further comprising:
a first circuit board having disposed thereon at least the first sensor and the first controller;
a second circuit board having disposed thereon at least the second sensor and the second controller; and
a cable electrically connecting the first circuit board and the second circuit board together.

3. The multi-pole circuit breaker of claim 1, further comprising:
a ground-fault sensor surrounding the first line conductor, the second line conductor, and a neutral conductor and producing a ground-fault sensor signal indicative of the sum of alternating current flowing through the first, second, and neutral conductors,
wherein the first controller includes a ground-fault input for receiving the ground-fault sensor signal,
wherein the first memory includes a first ground-fault detection algorithm operable to determine whether a ground fault is present as a function of the ground-fault input, and responsive thereto, produce the first output trip signal.

4. The multi-pole circuit breaker of claim 3,
wherein the second controller includes a ground-fault input for receiving the ground-fault sensor signal,
wherein the second memory includes a second ground-fault detection algorithm operable to determine whether the ground fault is present as a function of the ground-fault sensor signal, and responsive thereto, produce the second output trip signal.

5. The multi-pole circuit breaker of claim 1, wherein the first signal is a voltage that is proportional to a time rate of change of the alternating current flowing through the first line conductor, and wherein the first sensor is a current rate of change sensor and surrounds a portion of the first line conductor, and wherein the second signal is a voltage that is proportional to a time rate of change of the alternating current flowing through the second line conductor, and wherein the second sensor is a current rate of change sensor and surrounds a portion of the second line conductor.

6. The multi-pole circuit breaker of claim 1, wherein the first controller includes a first application specific integrated circuit (ASIC), and wherein the second controller includes a second ASIC that is identical to the first ASIC.

7. The multi-pole circuit breaker of claim 6, wherein the first controller further includes a microprocessor and the second controller further includes a microprocessor.

8. The multi-pole circuit breaker of claim 1, wherein the first controller or the second controller includes a microprocessor.

9. The multi-pole circuit breaker of claim 1, wherein the first memory is incorporated in the first controller.

10. The multi-pole circuit breaker of claim 1, wherein the first memory is separate from the first controller.

11. The multi-pole circuit breaker of claim 1, wherein the movable contact is operatively coupled to a first solenoid that is energized by the first output trip signal to cause the movable contact to separate.

12. The multi-pole circuit breaker of claim 1, further comprising a power supply producing a supply voltage derived from the first line conductor or the second line conductor, the supply voltage powering the first controller and the second controller.

13. A multi-pole circuit breaker operable to detect a series or parallel arc fault relative to one or more of at least two line conductors being monitored by the circuit breaker, comprising:
a first sensor producing a first signal indicative of alternating current flowing through a first line conductor of the at least two line conductors;
a second sensor producing a second signal indicative of alternating current flowing through a second line conductor of the at least two line conductors;
a first controller operatively coupled to the first sensor, the first controller being programmed with instructions corresponding to a first arc-fault detection algorithm stored on a first memory accessible by the first controller, wherein the first arc-fault detection algorithm is operable to determine whether the arc fault is present on at least the first line conductor as a function of the first signal, and responsive thereto, produce a first output trip signal at a first output pin of the first controller;
a first circuit board having disposed thereon at least the first sensor and the first controller;
a second controller operatively coupled to the second sensor, the second controller being programmed with the same instructions corresponding to the first arc-fault detection algorithm and stored on a second memory accessible by the second controller, wherein the first arc-fault detection algorithm is operable to determine whether the arc fault is present on at least the second line conductor as a function of the second signal, and responsive thereto, produce a second output trip signal at a second output pin of the second controller;
a second circuit board having disposed thereon at least the second sensor and the second controller;
a ground-fault sensor monitoring the first line conductor, the second line conductor, and a neutral conductor and producing a ground-fault sensor signal indicative of the sum of alternating current flowing through the first, second, and neutral conductors, wherein the ground-fault sensor is operatively connected to the first controller,
wherein the first memory includes a first ground-fault detection algorithm operable to determine whether a ground fault is present as a function of the ground-fault sensor signal, and responsive thereto, produce the first output trip signal, and
wherein the second memory includes a second ground-fault detection algorithm that is identical to the first ground-fault detection algorithm, but wherein the second controller is not operatively connected to the ground-fault sensor;
a movable contact operable to interrupt the flow of alternating current from the first line conductor or from the second conductor responsive to the first output trip signal or the second output trip signal,
wherein the first sensor is disposed in close proximity to the first controller on the first circuit board and the second sensor is disposed in close proximity to the second controller to reduce effects of electromagnetic interference or noise on signals carried between the first and second sensors and the first and second controllers, respectively,
wherein the first controller includes a first application specific integrated circuit (ASIC), and wherein the second controller includes a second ASIC that is identical to the first ASIC,
wherein the movable contact includes a first movable contact operatively coupled to the first line conductor and a second movable contact operatively coupled to the second line conductor;

a power supply producing a supply voltage derived from the first line conductor or the second line conductor, the supply voltage powering the first controller and the second controller; and a first solenoid operatively coupled to the first movable contact and to the second movable contact, the first solenoid being energized by the first trip output signal to cause at least the first movable contact to separate, the first solenoid being connected to the first output pin, and wherein the second output pin is connected to an input of the first controller.

14. The multi-pole circuit breaker of claim 13, wherein the first signal is a voltage that is proportional to a time rate of change of the alternating current flowing through the first line conductor, and wherein the first sensor is a current rate of change sensor and surrounds a portion of the first line conductor, and wherein the second signal is a voltage that is proportional to a time rate of change of the alternating current flowing through the second line conductor, and wherein the second sensor is a current rate of change sensor and surrounds a portion of the second line conductor.

15. The multi-pole circuit breaker of claim 2, wherein the movable contact includes a first movable contact operatively coupled to the first line conductor and a second movable contact operatively coupled to the second line conductor, the breaker further comprising:

a ground-fault sensor surrounding the first line conductor, the second line conductor, and a neutral conductor and producing a ground-fault sensor signal indicative of the sum of alternating current flowing through the first, second, and neutral conductors;

a power supply producing a supply voltage derived from the first line conductor or the second line conductor, the supply voltage powering the first controller and the second controller; and a first solenoid operatively coupled to the first movable contact and the second movable contact, the first solenoid being energized by the first output trip signal to cause at least the first movable contact to separate, the first solenoid being energized responsive to the second output trip signal to cause at least the second movable contact to separate, wherein the first sensor is disposed in close proximity to the first controller on the first circuit board and the second sensor is disposed in close proximity to the second controller on the second circuit board to reduce effects of electromagnetic interference or noise on signals carried between the first and second sensors and the first and second controllers, respectively.

16. The multi-pole circuit breaker of claim 1, wherein the movable contact includes a first movable contact operatively coupled to the first line conductor and a second movable contact operatively coupled to the second line conductor, the breaker further comprising:

a circuit board having disposed thereon the first sensor, the first controller, the second sensor, and the second controller;

a ground-fault sensor surrounding the first line conductor, the second line conductor, and a neutral conductor and producing a ground-fault sensor signal indicative of the sum of alternating current flowing through the first, second, and neutral conductors;

a power supply producing a supply voltage derived from the first line conductor or the second line conductor, the supply voltage powering the first controller and the second controller; and a first solenoid operatively coupled to the movable contact, the first solenoid being energized by the first output trip signal to cause the movable contact to separate, wherein the first sensor is disposed in close proximity to the first controller on the circuit board and the second sensor is disposed in close proximity to the second controller on the circuit board to reduce effects of electromagnetic interference or noise on signals carried between the first and second sensors and the first and second controllers, respectively.

* * * * *